US005477736A

United States Patent [19]

Lorraine

[11] Patent Number: 5,477,736

[45] Date of Patent: Dec. 26, 1995

[54] ULTRASONIC TRANSDUCER WITH LENS HAVING ELECTRORHEOLOGICAL FLUID THEREIN FOR DYNAMICALLY FOCUSING AND STEERING ULTRASOUND ENERGY

[75] Inventor: Peter W. Lorraine, Niskayuna, N.Y.

[73] Assignee: General Electric Company, Schenectady, N.Y.

[21] Appl. No.: 209,289

[22] Filed: Mar. 14, 1994

[51] Int. Cl.[6] .................... G01N 29/00

[52] U.S. Cl. .................... 73/642; 310/335; 128/663.01; 367/150

[58] Field of Search .................... 73/642, 644, 626, 73/628; 128/663.01; 367/150; 310/335

[56] References Cited

U.S. PATENT DOCUMENTS

| | | | |
|---|---|---|---|
| 3,936,791 | 2/1976 | Kossoff | 128/663.01 |
| 4,213,344 | 7/1980 | Rose | 73/642 |
| 4,281,550 | 8/1981 | Erikson | 73/642 |
| 4,338,821 | 7/1982 | Dion | 73/603 |

FOREIGN PATENT DOCUMENTS

| | | | |
|---|---|---|---|
| 179076 | 2/1966 | U.S.S.R. | 73/642 |
| 920519 | 4/1982 | U.S.S.R. | 73/642 |
| 1285715 | 8/1972 | United Kingdom | 73/642 |

OTHER PUBLICATIONS

Translation of SU 920519 pp. 1–3.

*Primary Examiner*—Hezron E. Williams
*Assistant Examiner*—Nashmiya Ashraf
*Attorney, Agent, or Firm*—David C. Goldman; Paul R. Webb, II

[57] ABSTRACT

An ultrasonic transducer having a transducer element which generates ultrasonic energy propagating along a transducer axis with a predetermined speed of propagation, and a lens acoustically coupled to the transducer element and having an input face positioned to receive the ultrasonic energy, wherein the lens includes electrorheological fluid with voltage dependent acoustic properties therein for enabling the speed of propagation to be selectively controlled as the ultrasonic energy passes through the lens. The transducer may include a focusing lens, a steering lens, or a combination thereof for selectively controlling the focusing and/or steering of the ultrasonic energy within a region of interest in an object to be inspected therewith. A voltage control device is used to controllably apply voltage to the lens to control the propagation speed as the ultrasonic energy passes therethrough. Acoustic matching and backing layers are also provided with electrorheological fluid having voltage dependent acoustic properties therein which enable the acoustic properties thereof to be selectively altered through the use of a voltage control device for selectively applying voltage thereto.

15 Claims, 3 Drawing Sheets

ULTRASONIC TRANSDUCER WITH LENS HAVING ELECTRORHEOLOGICAL FLUID THEREIN FOR DYNAMICALLY FOCUSING AND STEERING ULTRASOUND ENERGY

CROSS-REFERENCE TO RELATED APPLICATIONS

The present invention is related to copending application Ser. No. 08/162,988 filed Dec. 8, 1993, entitled "Ultrasonic Transducer with Magnetostrictive Lens for Dynamically Focussing and Steering a Beam of Ultrasonic Energy", which application is assigned to the instant assignee.

BACKGROUND OF THE INVENTION

The present invention relates to ultrasonic transducers and, more particularly, to an ultrasonic transducer having acoustic elements with electrorheological fluid therein for dynamically focusing and steering a beam of ultrasonic energy.

Ultrasonic transducers for medical or industrial applications include one or more piezoelectric elements sandwiched between a pair of electrodes. The electrodes are connected to a voltage source, and when voltage is applied thereto, the piezoelectric element is excited at a frequency corresponding to that of the applied voltage. As a result, the piezoelectric element emits an ultrasonic beam into the media to which it is coupled at frequencies corresponding to the excitation pulse. Conversely, when an ultrasonic beam strikes the piezoelectric element, the element produces a corresponding voltage across its electrodes.

By selectively transmitting an ultrasonic beam and receiving echo signals therefrom, ultrasonic transducers can be used for non-destructive evaluation (NDE) of various materials in both medical and industrial applications. For example, ultrasonic transducers are used for ultrasonic pulse-echo inspection of metal objects or manufactured parts made of large grain metals such as titanium or the like, to identify flaws in the metal, abnormally large grains, or any other indications of interest.

Ultrasonic inspection systems must incorporate some scheme for focusing and directing sound radiation emitted from the transducer to provide spacial resolution. In order to thoroughly inspect an object it is necessary to focus and/or direct the beam of ultrasonic energy at various locations relative to the object being inspected. For example, it is desirable for an inspection system to be capable of focusing the sound beam at various depths within the object and/or to direct the sound beam to various locations on or within the object. In other words, ultrasonic inspection systems require a means for enabling an entire region of interest on an object to be scanned with the beam of ultrasonic energy. The region of interest may be a one-dimensional line on or through the object, a two-dimensional plane within the object, or a three-dimensional section of the object. Thus, ultrasonic inspection systems require sound beam control in all dimensions necessary to scan the object in accordance with the particular application and region of interest.

BRIEF DESCRIPTION OF THE PRIOR ART

Conventionally, fixed focus lenses comprising material with different sound velocity than the surrounding medium are used with ultrasonic transducers to confine or focus a sound beam in either one or two directions which delineate a region of optimal performance for the transducer. Typically, when using a fixed focus lens, the transducer must be physically moved or translated relative to the object being inspected in order to scan the entire region of interest. Thus, the use of a fixed focus lens has the disadvantage of requiring a mechanical translation device for moving the transducer relative to the region of interest. Obviously, providing a translation device significantly adds to the cost and complexity of an ultrasonic inspection system.

Another technique which has been used to scan a region of interest is to provide a plurality of piezoelectric elements arranged in an array and driven with separate voltages. By controlling the time delay (or phase) and amplitude of the applied voltages, the ultrasonic beam produced by the piezoelectric elements can be combined to produce a net ultrasonic beam focused at a selected point in the region of interest. By controlling the time delay and amplitude of the applied voltages, the focal point can be selectively moved or synthesized within an image plane to scan the region of interest. One dimensional (1D) phased arrays have been used to direct and focus ultrasound within a plane and fixed focus lenses have been used therewith to provide out of plane focussing. This form of ultrasonic imaging is referred to as "phased array sector scanning", or "PASS".

While the PASS technique provides significant inspection capability, synthesizing a focus therewith requires a large number of electronic components to impart the time delays (and/or phase shifts) to the signals from each transducer array element. Thus, a major disadvantage of the PASS technique is that such a large number of electronic components significantly adds to the cost and complexity of the imaging system.

Volumetric (3D) inspections require either mechanical translation or the use of two dimensional phased arrays. Due to the cost and complexity of phased arrays, typically only one-dimensional (1D) arrays are used. Thus, in order to provide volumetric (3D) inspections with an inspection system having a 1D phased array, it is necessary to also provide means for mechanically translating the array relative to the region of interest. Obviously, providing both phased array electronics and mechanical translation in an ultrasonic inspection system greatly increases the cost and complexity thereof.

Another disadvantage of the prior art inspection systems is that the matching and backing layers used therein have fixed or static acoustic properties that have only a small range in which they provide optimal performance. Thus, the acoustic properties of the matching layers and backing layers cannot be dynamically changed to provide optimal performance characteristics when, for example, other acoustic elements in the inspection system are changed.

Due to the disadvantages of the prior art inspection systems, there is a need in the art for an improved ultrasonic transducer which is capable of dynamically focussing and/or steering a beam of ultrasonic energy in a manner which eliminates the need for a large number of electronic components and/or mechanical translation means. A further need exists in the art for improved matching and backing layers for use in ultrasonic inspection systems which have dynamically adjustable acoustic properties.

SUMMARY OF THE INVENTION

A primary object of the present invention is to provide an ultrasonic transducer which enables the ultrasonic energy therefrom to be dynamically steered and/or focused within a region of interest in an object to be inspected therewith.

A more specific object of the invention is to provide an ultrasonic transducer which is cheaper and less complex than prior art transducer devices.

A further object of the invention is to provide an ultrasonic transducer having a variable focus lens which enables the position of optimum image quality to be selectively and dynamically changed without requiring mechanical translation.

Another object of the invention is to provide an ultrasonic transducer having a dynamically adjustable steering lens which enables full volumetric imaging without the need for phased array electronics and/or mechanical translation means.

Yet another object of the invention is to provide an ultrasonic transducer wherein acoustic elements thereof have voltage dependent acoustic properties, including sound velocity, attenuation and/or non-linearity.

Still another object of the invention is to provide an ultrasonic transducer having acoustic matching and/or backing layers which have voltage dependent acoustic properties so that the range of optimal performance thereof can be dynamically adjusted.

These and other objects and advantages are achieved by the present invention which provides an ultrasonic transducer which generates ultrasonic energy propagating along a transducer axis with a predetermined speed of propagation, and a lens acoustically coupled to the transducer element and having an input face positioned to receive the ultrasonic energy, wherein the lens includes electrorheological fluid with voltage dependent acoustic properties therein for enabling the speed of propagation to be selectively controlled as the ultrasonic energy passes through the lens.

In accordance with one aspect of the invention, the ultrasonic transducer further includes means for controllably applying voltage to the lens to selectively control the speed of propagation of the ultrasonic energy the ultrasonic energy passes through the lens.

In accordance with one embodiment of the invention, the lens is a focusing lens having an output face with a curved surface and the transducer further includes means for controllably applying voltage to the lens to selectively control the focus thereof.

In accordance with another embodiment of the invention, the lens is a steering lens having a substantially planar output face positioned at a predetermined angle relative to the transducer axis, and the transducer further includes means for controllably applying voltage to the lens to selectively direct the ultrasonic energy to a predetermined angle relative to the transducer axis.

In accordance with a further embodiment of the invention, the transducer includes a plurality of transducer elements arranged in an array, wherein the lens is a focusing lens which focuses the ultrasound along a line within the image plane, and further including means for controllably applying voltage to the lens to selectively position the line within the image plane.

In accordance with yet another embodiment of the invention, the transducer includes a plurality of transducer elements arranged in an array and having a given image plane, wherein the lens is a steering lens having a substantially planar output face positioned at a predetermined angle relative to the transducer axis for selectively rotating the image plane relative to the transducer axis, and further including means for controllably applying voltage to the lens to selectively rotate the image plane.

In accordance with still another embodiment of the invention, a focusing and a steering lens are provided with electrorheological fluid therein, and means are provided for controllably applying voltages to the focusing lens and the steering lens, respectfully, to enable the ultrasonic energy to be selectively steered and focused within an image plane.

In accordance with another aspect of the invention, the transducer includes an acoustic backing layer having a surface positioned at an angle to the transducer axis, wherein the backing layer includes electrorheological fluid therein for enabling the acoustic properties of the backing layer to be selectively altered by controllably applying voltage thereto.

In accordance with another aspect of the invention, the transducer includes an acoustic matching layer having electrorheological fluid therein for enabling the acoustic properties of the matching layer to be selectively altered by controllably applying voltage thereto.

BRIEF DESCRIPTION OF THE DRAWINGS

Other objects and advantages of the subject invention will become apparent from a study of the following specification when viewed in light of the accompanying drawings, in which.

DETAILED DESCRIPTION OF THE PREFERRED EMBODIMENT

Figure 1A:
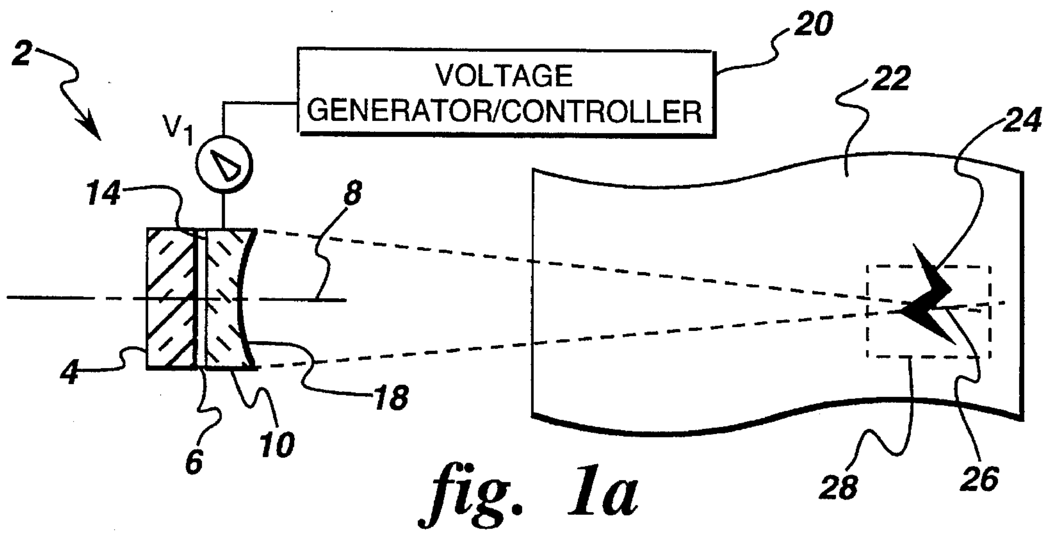
FIGS. 1*a* and 1*b* depict an ultrasonic transducer with a lens constructed in accordance with the present invention and having two different voltages applied thereto, respectively.
Figure 1B:
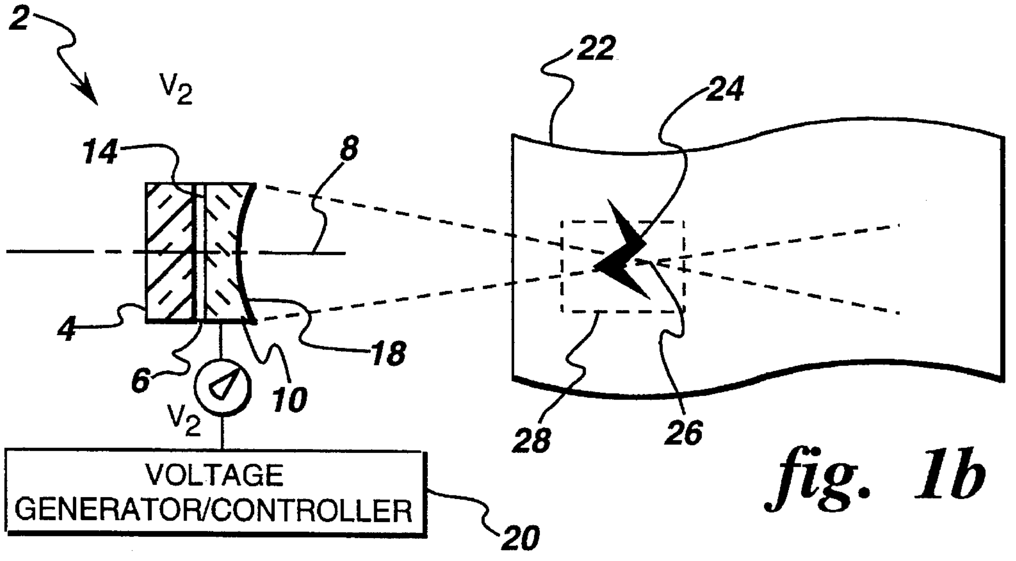
Figure 2:
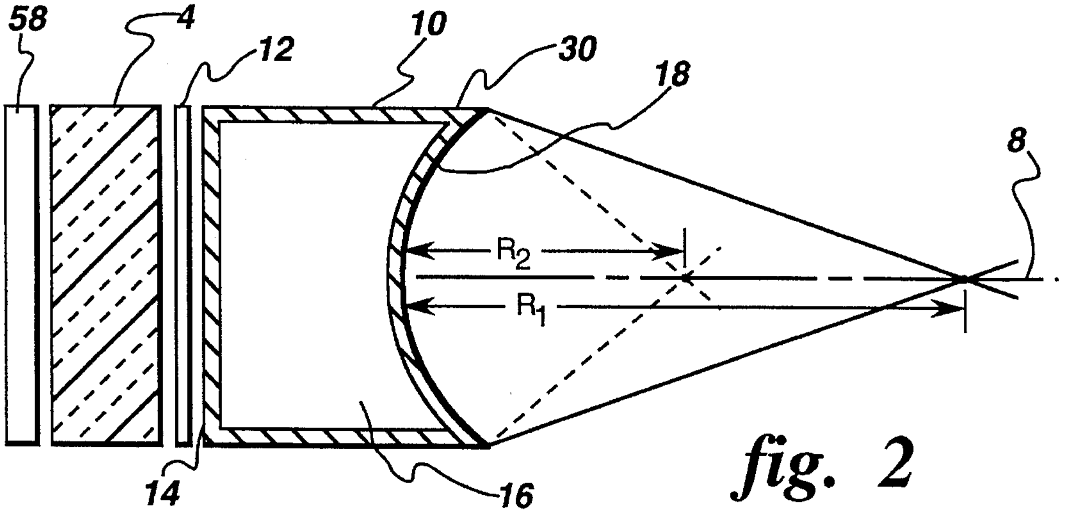
FIG. 2 depicts a sectional view of an ultrasonic transducer having an exemplary lens and matching and backing layers in accordance with the present invention.

Referring now to the drawings, and more particularly to FIGS. 1*a* and 1*b* and 2, wherein like reference numerals designate similar parts throughout the various views. FIG. 1*a* shows an ultrasonic transducer 2 constructed in accordance with the present invention and intended for use in an ultrasonic imaging system (not shown). The transducer 2 includes a piezoelectric transducer element 4, as generally known to one skilled in the art of ultrasonic inspection systems. The transducer element 4 generates a beam of ultrasonic energy 6 which initially propagates along a transducer axis 8 with a predetermined speed of propagation. A lens 10 is acoustically coupled to the transducer element 4 either directly or indirectly through the use of a beam matching layer 12, as shown in FIG. 2. An input face 14 of the lens 10 is positioned at an angle with respect to the transducer axis 8 to receive the beam of ultrasonic energy 6 and to cause the ultrasonic energy 6 to pass through the lens 10. The input face 14 is preferably positioned at an angle of 90 degrees relative to the transducer axis 8, however, any suitable angle may be used.

As shown in FIG. 2, the lens 10 includes electrorheological fluid 16 having voltage dependent acoustic properties therein. In other words, the electrorheological fluid 16 has acoustic properties, including sound velocity, attenuation and/or non-linearity, which can be altered or adjusted by applying an electric field thereto. This enables dynamic control of the acoustic properties of the electrorheological fluid, and therefore the lens, by selectively applying a voltage thereto. Thus, the resulting effect which the lens 10 has on the ultrasonic energy 6 can be dynamically changed in accordance with a desired result by controllably applying voltage thereto.

The lens 10 may be a steering lens, a focusing lens, or any other suitable shaped lens depending on the particular application in which the lens is used. If the lens 10 is a focusing lens, i.e. having a curved output surface 18, a change in the voltage applied to the lens 10 will cause the sound velocity of the ultrasonic energy 6 passing therethrough to also change. As a result, the focus of the lens, or the region of maximum sensitivity for the transducer, can be controlled and dynamically changed by changing the speed at which the ultrasonic energy 6 passes through the lens 10. Thus, the electrorheological fluid 16 enables the lens 10 to have a dynamically variable focus.

As shown in FIGS. 1*a* and 1*b*, the lens 10 is connected with a suitable voltage generator/controller device 20 which enables voltage to be selectively applied to the lens 10 for increasing and decreasing the ultrasonic propagation speed therethrough. One application for the variable focus lens 10, as shown in FIGS. 1*a* and 1*b*, is in ultrasonic inspection systems used for inspecting a manufactured part 22 or the like for detecting whether a flaw 24 exists therein. The advantage of the dynamically adjustable lens 10 in accordance with the present invention, is that the focal point 26 of the lens 10, and the region of maximum sensitivity 28, can be moved to various depths within the part 22 to enable a greater probability of detecting a flaw 24. For example, when a voltage $V_1$ is applied to the lens 10, as shown in FIG. 1*a*, the lens 10 will have a focal point 26 which extends relatively deep into the part 22 being inspected. One the other hand, if the voltage is increased from $V_1$ to $V_2$, as shown in FIG. 1*b*, the propagation speed of the ultrasonic energy 6 through the lens 10 will increase, thereby causing the focal point 26 of the lens 10 to shift to a point which is relatively closer to the transducer 2. In other words, as shown in FIG. 2, the focal length of the lens 10 can be adjusted from a first focal length $R_1$, corresponding to a first voltage $V_1$, to a second focal length $R_2$, corresponding to a second voltage $V_2$ which is greater than the first voltage $V_1$. Thus, the variable focus lens 10 of the present invention can advantageously be used to replace a conventional fixed focus lens used in non-destructive evaluation (NDE) of materials, which fixed focus lens requires either mechanical translation or a different transducer element to change the focal point relative to the object being inspected. The variable focus lens 10 of the present invention enables greater detectability of flaws when the flaws are distributed at various depths in the material being inspected. The variable focus lens of the present invention provides greater flexibility and speed than fixed focus systems.

As shown in FIG. 2, the lens 10 includes an outer housing member or shell 30 which contains the electrorheological fluid 16 therein. Electrodes (not shown) are provided on the inside of the shell 30 for connection with the voltage control device 20 to enable an electric field to be applied to the fluid 16. Generally, the electrorheological fluid 16 consists of dielectric particles floating in an insulating fluid, wherein the fluid has voltage dependent flow properties. When a voltage is applied to the fluid 16 by the voltage control device 20, the particles, which normally are randomly dispersed throughout the fluid, align themselves into particles rows or "chains" between the bias electrodes. When the particles are aligned, rather than randomly dispersed, the propagation speed of the ultrasonic energy passing through the lens 10 is increased. In other words, the functional form of the modulus of the fluid 16 changes with the re-orientation of the particles by the presence of an electric field. The foregoing property of electrorheological fluids is advantageously exploited by the present invention to enable the speed of propagation of ultrasonic energy passing through the fluid to be dynamically varied by varying the electric field applied thereto.

Electrorheological fluids are known and have been used in the past in, for example, clutches and shock absorber systems for automotive applications. Any known electrorheological fluid having voltage dependent acoustic properties could be used in the transducer 2 of the present invention. For example, the combination of corn starch and vegetable oil results in an electrorheological fluid. Preferably, the particulate material in the electrorheological fluid is selected to be very hard or to have a high modulus with a high dielectric constant so that the particles readily reorient themselves upon application of an electric field thereto. Thus, preferable electrorheological fluid would have a hard particulate phase with a high acoustic impedance or high sound velocity. An example of a preferred particulate material is a piezoelectric material such as lead zirconium titanate (PZT). The fluid surrounding the particulate material is preferably a silicon based oil with a high breakdown voltage so that when voltage is applied thereto the material is not degraded or destroyed. The particular electrorheological fluid used is a design parameter which can be selected in accordance with the particular application in which the present invention is used. The choice of the particular material used for the shell 30 is also a design parameter which can be selectively chosen, as understood by those skilled in the art, to provide suitable acoustical coupling for the sound beam passing therethrough.

Figure 3:
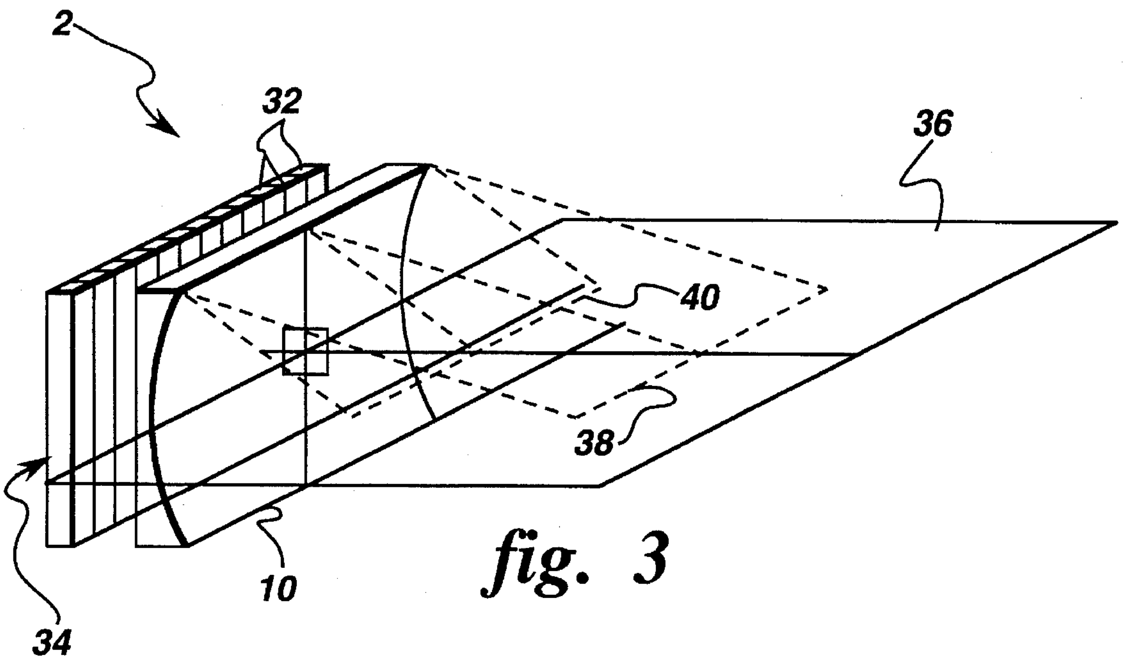
FIG. 3 is a perspective view of a phased array transducer and a steering element in accordance with the present invention.

Referring now to the alternative embodiment of FIG. 3, wherein the transducer 2 includes a plurality of transducer elements 32 defining a phased array 34, and an elongated focusing lens 10 with electrorheological fluid having voltage depending acoustic properties therein. The phased array 34 includes phased array electronics (not shown) to enable phased array sector scanning or "PASS" to be performed therewith, as known to one skilled in the art. The lens 10 causes the ultrasonic energy emitted from the transducer elements 32 to focus at a particular depth in an image plane 36, depending on the propagation speed at which the ultrasonic energy passes therethrough. Inasmuch as ultrasonic inspection systems have best resolution at the place where the ultrasonic energy is focussed, it is desirable to be able to adjust the focal depth thereof. In accordance with the present invention, the lens 10 is used to dynamically adjust the depth at which the ultrasonic energy focuses by selectively applying voltage thereto through the use of a voltage control device (not shown), as explained in detail above. For example, by changing the voltage applied to the lens 10, the depth at which the sound is focused can be dynamically changed from line 38 to line 40 in the image plane 36. Thus, the lens 10 of the present invention can be advantageously used to replace a fixed focus lens used with a phased array transducer in medical and/or industrial inspection systems, thereby eliminating the need for mechanical translation of the transducer.

Figure 4:
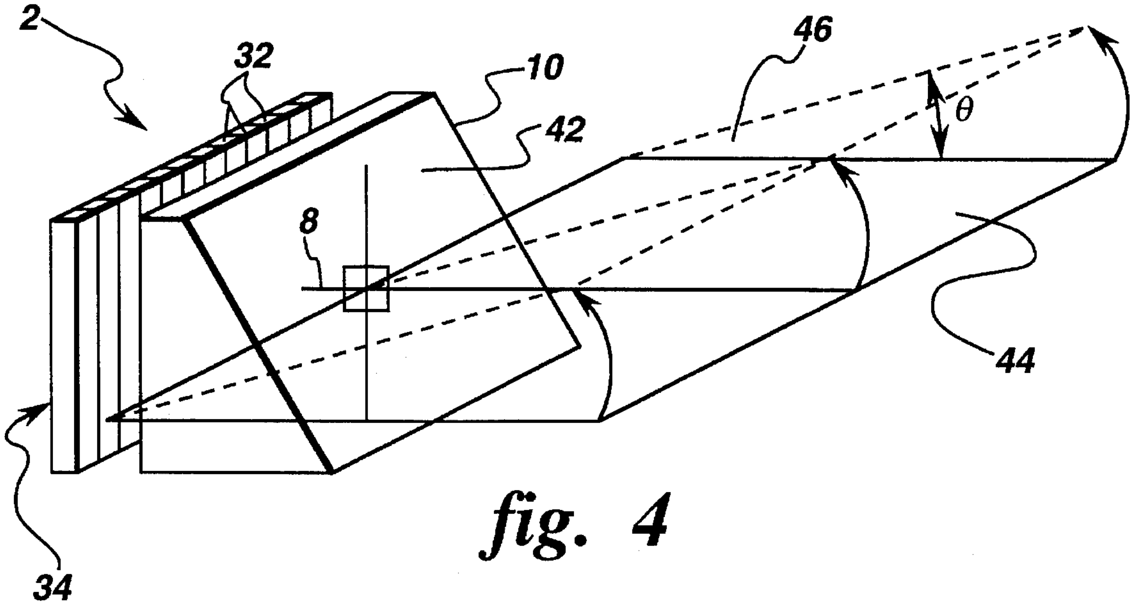
FIG. 4 is a perspective view of a phased array transducer and a steering element in accordance with the present invention.

Referring now to the embodiment of FIG. 4, wherein a steering lens 10 rather than a focusing lens is shown. The steering lens 10 is similar to the focussing lens described above, except that the output surface 42 thereof is a planar surface instead of a curved surface. The output surface 42 of the lens 10 is positioned at a predetermined angle relative to the transducer axis 8. The output surface 42 of the lens 10 causes the image plane 44 to be rotated relative to the transducer axis 8 by an angle of refraction 8, thereby resulting in a rotated image plane 46. By controllably applying voltage to the steering lens 10, the speed of propagation of the ultrasonic energy passing through the lens can be selectively controlled, thereby enabling the angle of rotation 8 of the rotated image plane 46 to be dynamically adjusted. Hence, full volumetric (3D) imaging can be achieved with the present invention without requiring a 2D phased array or mechanical translation of the transducer. In accordance with the present invention, a steering lens can be used in the embodiment of FIGS. 1*a* and 1*b* instead of the focusing lens 10 to cause the ultrasonic energy 6 to be dynamically steered or directed to various locations within the part 22.

Figure 5:
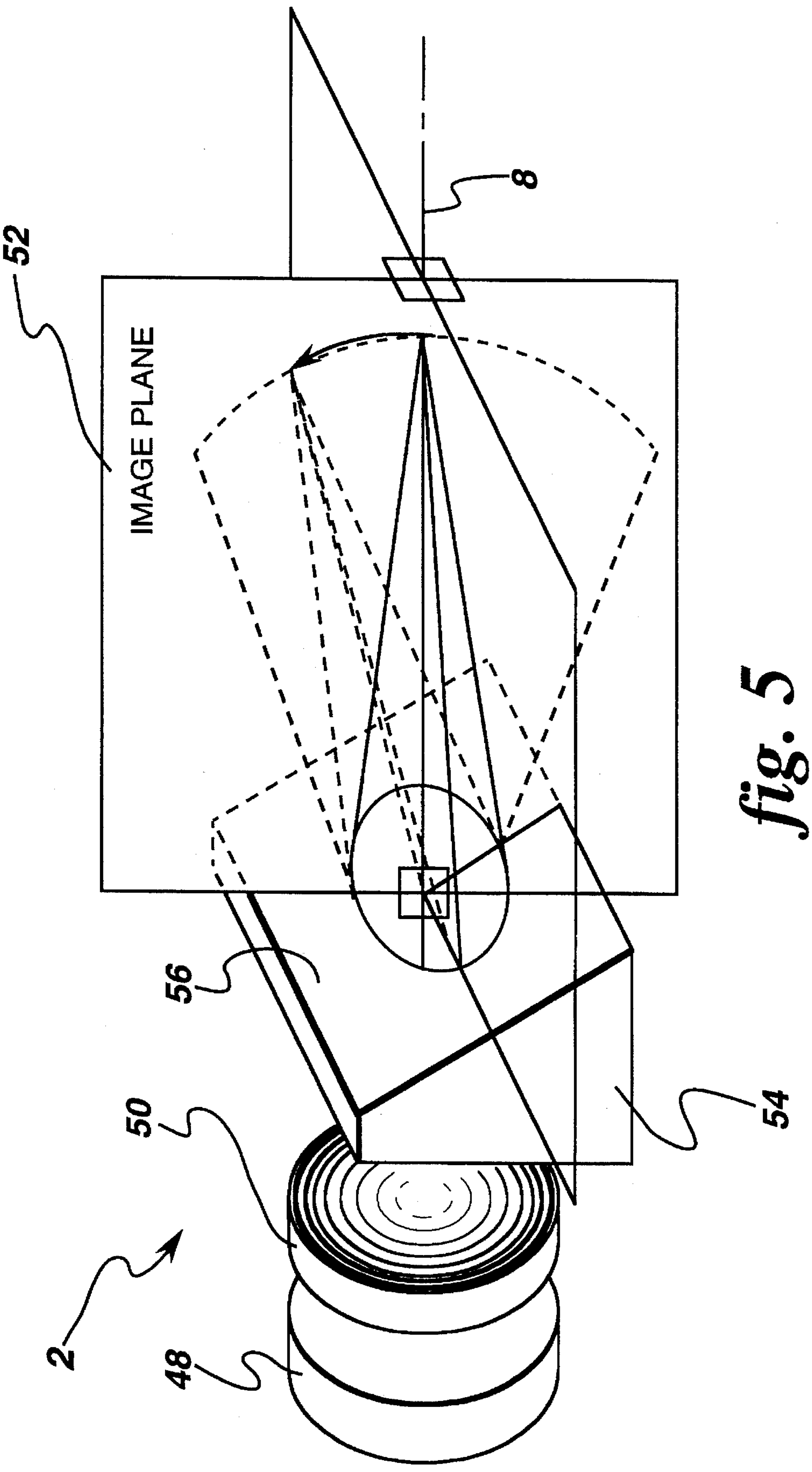
FIG. 5 is a perspective view of a single element transducer and focusing and steering lenses in accordance with the present invention.

Referring now to FIG. 5, wherein an alternative embodiment of the present invention is shown which can be used to replace a conventional one-dimensional (1D) phased array transducer described above. The transducer 2 includes a single transducer element 48 which generates ultrasonic energy propagating along a transducer axis 8 with a predetermined speed of propagation. A focusing lens 50 having electrorheological fluid with voltage dependent acoustic properties therein is provided for dynamically focusing the ultrasonic energy at a selected range along the transducer axis 8 in the image plane 52. The focusing lens 50 is similar to the lens 10 described with respect to FIGS. 1*a* and 1*b* above. A voltage generator/controller device (not shown) is connected to the lens 50 for controllably applying voltage thereto to selectively adjust the propagation speed of the ultrasonic energy passing therethrough, thereby varying the focal length thereof.

A second lens 54 is provided in the form of a steering lens having electrorheological fluid with voltage dependent acoustic properties therein for dynamically steering the ultrasonic energy at an angle relative to the transducer axis 8 within the image plane 52. The steering lens 52 is similar to the steering lens 10 described with respect to FIG. 5 above. A voltage generator/controller device (not shown) is connected to the lens 52 for controllably applying voltage to selectively adjust the propagation speed of the sound passing therethrough, thereby causing the sound to be selectively steered within the image plane 52.

Thus, by selectively controlling the speed of propagation of the ultrasonic energy through both the focussing lens 50 and the steering lens 54, a two-dimensional (2D) image plane is achieved with only a single transducer element 48 and without the need for mechanical translation thereof. From the foregoing description, it should be appreciated that such dynamic focusing and steering of ultrasound beams is accomplished by the present invention without having to use a large number transducer elements and associated electronics typically required of systems using PASS techniques.

In accordance with the invention, a second steering lens and associated voltage control device could be added to the transducer of FIG. 5 with an output face positioned at 90 degrees relative to the output face 56 of lens 54 to enable full volumetric (3D) imaging to be performed with only the single transducer element 48.

In accordance with the present invention, the ultrasonic transducer 2 may include an acoustic backing layer 58, as shown in FIG. 2, for preventing ultrasonic energy from being transmitted or reflected behind the transducer element 4. Backing layers having fixed acoustical properties are well known in the art and are used to dampen the ultrasonic energy transmitted from transducer elements. However, in accordance with the present invention, a backing layer 58, as shown in FIG. 2, is provided having electrorheological fluid with voltage dependent acoustic properties therein to enable the backing layer 58 to have dynamically adjustable acoustic properties. Due to the properties of electrorheological fluids described above, the backing layer 58 can be connected to a voltage source and a suitable control device, similar to that shown in FIGS. 1*a* and 1*b*, for controllably applying voltage to the backing layer 58 so that the acoustical properties thereof can be selectively varied. Due to the fact that fixed acoustic properties backing layers have only a small range or band of frequencies at which they provide optimal performance, the backing layer 58 of the present invention can be advantageously used to replace conventional backing layers, thereby providing a much larger and dynamically adjustable range of optimal performance.

In accordance with the present invention, the ultrasonic transducer 2 may include one or more acoustic matching layers, such as the matching layer 12 shown in FIG. 2, for providing suitable matching impedance to the ultrasonic energy as it passes between various acoustical elements in the transducer. For example, a matching layer 12 may be positioned between the transducer element 4 and the lens 10 to minimize reflection of the energy as it passes therebetween. A matching layer could also be provided at the output face of the lens to efficiently pass the ultrasonic energy from the lens 10 to the surrounding medium in which the transducer 2 is used. Acoustic matching layers with fixed acoustical properties are well known in the art and have been used to reduce reflection at the interface of acoustic elements. However, in accordance with the present invention, a matching layer 12, as shown in FIG. 2, is provided having electrorheological fluid with voltage dependent acoustic properties therein to enable the matching layer 12 to have dynamically adjustable acoustic properties. Due to the properties of electrorheological fluids described above, the matching layer 12 can be connected to a voltage source and a suitable control device, similar to that shown in FIGS. 1*a* and 1*b*, for controllably applying voltage to the matching layer 12 so that the acoustical properties thereof can be selectively varied. Due to the fact that fixed property matching layers have only a small range or band of frequencies at which they provide optimal performance, the matching layer 12 of the present invention can be advantageously used to replace conventional matching layers, thereby providing a much larger and dynamically adjustable range of optimal performance thereof. The dynamically adjustable matching layer 12 of the present invention could, for the properties. Due to the properties of electrorheological fluids described above, the matching layer 12 can be connected to a voltage source and a suitable control device, similar to that shown in FIGS. 1*a* and 1*b*, for controllably applying voltage to the matching layer 12 so that the acoustical properties thereof can be selectively varied. Due to the fact that fixed property matching layers have only a small range or band of frequencies at which they provide optimal performance, the matching layer 12 of the present invention can be advantageously used to replace conventional matching layers, thereby providing a much larger and dynamically adjustable range of optimal performance thereof. The dynamically adjustable matching layer 12 of the present invention could, for example, have particular utility in a transducer having two or more frequency modes. The acoustical properties of the matching layer could be dynamically altered by selectively applying an electric field thereto so that the matching layer 12 provides optimal performance for all of the frequency modes of the transducer.

While the preferred forms and embodiments of the invention have been illustrated and described, it will be apparent to those of ordinary skill in the art that various changes and modifications may be made without deviating from the inventive concepts and spirit of the invention as set forth above, and it is intended by the appended claims to define all such concepts which come within the full scope and true spirit of the invention.

What is claimed is:

1. An ultrasonic transducer, comprising;

means for generating ultrasonic energy propagating along a transducer axis with a predetermined speed of propagation; and a lens acoustically coupled to said ultrasonic energy generating means, said lens having an input,face positioned to receive said ultrasonic energy and a focal point extending into a subject, said lens including an electrorheological fluid having voltage dependent acoustic properties therein for enabling said speed of propagation and said focal point to be selectively controlled as said ultrasonic energy passes through said lens, said electrorheological fluid consisting of dielectric particles floating in an insulating fluid having voltage dependent flow properties.

2. The ultrasonic transducer as defined in claim 1, further including means for controllably applying a voltage to said lens to selectively control said speed of propagation of said ultrasonic energy as said ultrasonic energy passes through said lens.

3. The ultrasonic transducer as defined in claim 1, wherein said lens is a focusing lens having an output face with a curved surface, said curved surface being substantially centered relative to said transducer axis.

4. The ultrasonic transducer as defined in claim 3, further including means for controllably applying a voltage to said lens to selectively control the focus of said lens.

5. The ultrasonic transducer as defined in claim 1, wherein said lens is a steering lens having a substantially planar output face positioned at a predetermined angle relative to said transducer axis.

6. The ultrasonic transducer as defined in claim 5, further including means for controllably applying a voltage to said lens to selectively direct said ultrasonic energy at a predetermined angle relative to said transducer axis.

7. The ultrasonic transducer as defined in claim 1, further including a plurality of transducer elements arranged in an array, and further wherein said lens is a focusing lens having an output face with a curved surface for focusing ultrasonic energy along a line within an image plane.

8. The ultrasonic transducer as defined in claim 7, further including means for controllably applying a voltage to said lens to selectively position said line within said image plane.

9. The ultrasonic transducer as defined in claim 1, wherein said means for generating ultrasonic energy includes a plurality of transducer elements arranged in an array and having a given image plane, and further wherein said lens is a steering lens having a substantially planar output face positioned at a predetermined angle relative to said transducer axis for selectively rotating said image plane relative to said transducer axis.

10. The ultrasonic transducer as defined in claim 9, further including means for controllably applying a voltage to said lens to selectively rotate said image plane relative to said transducer axis.

11. The ultrasonic transducer as defined in claim 1, wherein said lens is a focusing lens having an output face with a curved surface, and further including a second lens positioned to receive said ultrasonic energy, said second lens including electrorheological fluid with voltage dependent acoustic properties therein, and further wherein said second lens is a steering lens having a substantially planar surface positioned at a predetermined angle relative to said transducer axis.

12. The ultrasonic transducer as defined in claim 11, further including means for controllably applying a voltage to said focusing lens and said steering lens, respectfully, to enable said ultrasonic energy to be selectively steered and focused within an image plane.

13. The ultrasonic transducer as defined in claim 2, wherein said electrorheological fluid has a high modulus with a high dielectric constant for reorienting the dielectric particles as said voltage is applied.

14. The ultrasonic transducer as defined in claim 13, wherein said dielectric particles align into rows of particles as said voltage is applied, changing the modulus of said electrorheological fluid.

15. The ultrasonic transducer as defined in claim 14, wherein said electrorheological fluid includes a combination of corn starch and vegetable oil.

* * * * *